US007627536B2

(12) United States Patent
Kacmarcik (10) Patent No.: US 7,627,536 B2
(45) Date of Patent: Dec. 1, 2009

(54) DYNAMIC INTERACTION MENUS FROM NATURAL LANGUAGE REPRESENTATIONS

(75) Inventor: Gary J. Kacmarcik, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 450 days.

(21) Appl. No.: 11/451,909

(22) Filed: Jun. 13, 2006

(65) Prior Publication Data

US 2007/0288404 A1 Dec. 13, 2007

(51) Int. Cl.
G06F 17/00 (2006.01)
(52) U.S. Cl. .................... 706/11; 345/474; 715/706
(58) Field of Classification Search .................. 706/11; 715/706; 345/474
See application file for complete search history.

(56) References Cited

U.S. PATENT DOCUMENTS

| | | | | |
|---|---|---|---|---|
| 5,821,932 | A | 10/1998 | Pittore | 345/347 |
| 6,160,987 | A * | 12/2000 | Ho et al. | 434/350 |
| 6,243,670 | B1 * | 6/2001 | Bessho et al. | 704/9 |
| 6,246,404 | B1 | 6/2001 | Feigner et al. | 345/338 |
| 6,285,380 | B1 * | 9/2001 | Perlin et al. | 345/473 |
| 6,418,440 | B1 * | 7/2002 | Kuo et al. | 707/10 |
| 6,433,797 | B1 | 8/2002 | Zellweger | 345/762 |
| 6,542,172 | B1 | 4/2003 | Yamamoto | 345/837 |
| 6,570,555 | B1 * | 5/2003 | Prevost et al. | 345/156 |
| 6,829,603 | B1 * | 12/2004 | Chai et al. | 707/5 |
| 6,850,603 | B1 | 2/2005 | Eberle et al. | 379/88.16 |
| 6,952,800 | B1 | 10/2005 | Danner et al. | 715/513 |
| 6,980,984 | B1 | 12/2005 | Huffman et al. | 707/3 |
| 7,246,315 | B1 * | 7/2007 | Andrieu et al. | 715/706 |
| 2003/0028498 | A1 * | 2/2003 | Hayes-Roth | 706/17 |
| 2003/0174166 | A1 | 9/2003 | DeLaRosa et al. | 345/751 |
| 2004/0098265 | A1 * | 5/2004 | Kelly et al. | 704/270 |
| 2004/0216036 | A1 | 10/2004 | Chu et al. | 715/501.1 |
| 2005/0049874 | A1 | 3/2005 | Coffman et al. | 704/257 |
| 2005/0144573 | A1 | 6/2005 | Moody et al. | 715/825 |
| 2005/0246174 | A1 | 11/2005 | DeGolia | 704/270 |
| 2006/0072738 | A1 * | 4/2006 | Louis et al. | 379/265.02 |

OTHER PUBLICATIONS

Vibhu O. Mittal and Johanna D. Moore, "Dynamic Generation of Follow Up Question Menus: Facilitating Interactive Natural Language Dialogues," approx. 1994, 11 pages.

(Continued)

*Primary Examiner*—David R Vincent
*Assistant Examiner*—Mai T Tran
(74) *Attorney, Agent, or Firm*—Westman, Champlin & Kelly, P.A.

(57) ABSTRACT

Natural language dialog elements may be dynamically generated in a virtual world when an interaction is initiated between a user and a computer-controlled character. The dialog elements may be generated by combining abstract semantic representations from a knowledgebase of a computer-controlled character involved in the interaction, with abstract semantic representations from a current state of the virtual world. For example, the abstract semantic representations from the current state of the virtual world may describe the user's progress in accomplishing a set of interrelated goals. A program enables developers of games and other virtual worlds to provide dynamic dialog generation after simply entering natural language descriptions of potential game states and computer-controlled character knowledge. Compared to manually scripting dialog in advance, enabling a program to dynamically generate dialog elements provides for exponentially increasing variety, flexibility, and apparent intelligence in computer-controlled character dialog.

18 Claims, 5 Drawing Sheets

OTHER PUBLICATIONS

Carsten Magerkurth, Richard Stenzel, Norbert Streitz, and Erich Neuhold, "A Multimodal Interaction Framework for Pervasive Game Applications," Oct. 12, 2003, 8 pages.

Bryan L. Chapman, "Object-Oriented Scripting for Interactive Multimedia," approx. 1996, 7 pages.

Chris Quirk, Arul Menezes and Colin Cherry, "Dependency Treelet Translation: Syntactically Informed Phrasal SMT," approx. 2004, 9 pages.

Marc Cavazza and Fred Charles, "Dialogue Generation in Character-based Interactive Storytelling," approx. 2004, 6 pages.

Takako Aikawa, Maite Melero, Lee Schwartz and Andi Wu, "Multilingual Sentence Generation," approx. 2001, 7 pages.

Michael Mateas and Andrew Stern, "Procedural Authorship: A Case-Study of the Interactive Drama Façade," approx. 2005, 8 pages.

Rada Mihalcea and Paul Tarau, "TextRank: Bringing Order into Texts," approx. 2004, 8 pages.

* cited by examiner

DYNAMIC INTERACTION MENUS FROM NATURAL LANGUAGE REPRESENTATIONS

BACKGROUND

Applications executed by computing devices are often used to simulate virtual worlds with computer-controlled characters. Such virtual worlds may be used, for example, in video games, in training programs, or in educational programs, among other uses. Many separate computer-controlled characters, also known as non-player characters, may be included in a single virtual world. This is particularly true in the illustrative example of large-scale virtual worlds, which may be used in single-player or multi-player computer games, for example. Other useful applications using less extensive virtual worlds may include, for example, a virtual assistant that may answer questions or otherwise provide help to a user. Virtual worlds and computer-controlled characters support a broad range of applications that have demonstrated a strong and persistently growing demand. There is correspondingly a great interest in improving the sophistication with which game players and other users of virtual worlds may interact with virtual worlds and computer-controlled characters.

Interaction with computer-controlled characters has been of limited sophistication, due in part to the labor required to try to anticipate and author user dialog elements that a computer-controlled character can recognize, and computer-controlled character dialog elements that a computer-controlled character can use appropriately to respond to the user dialog elements. Authoring dialog for virtual worlds is costly and does not scale well. Every increase in the size and sophistication of the possible dialog interactions between users and computer-controlled characters, requires the additional labor of manually authoring each new dialog element. Costs associated with such manual dialog authoring are a significant factor in constraining virtual world developers to narrow the scope of possible dialog and restrict the options available to users of the virtual world. Developers of virtual worlds in general are very interested in increasing the variety and sophistication of computer-controlled character dialog and creating the illusion of intelligence in computer-controlled characters, but that illusion is quickly dispelled when a user attempts to engage in dialog that is outside the range that was previously authored for the computer-controlled character. While it is physically possible to keep authoring more and more dialog elements that a computer-controlled character can recognize and use in response, in practice this is severely limited by the amount of investment in developer time and effort that can be justified by the utility of the virtual world, so that dialog authoring beyond nominal limits of sophistication can become prohibitively expensive.

The discussion above is merely provided for general background information and is not intended to be used as an aid in determining the scope of the claimed subject matter.

SUMMARY

Automatically, dynamically generating dialog elements for dialog between users and computer-controlled characters in a virtual world is provided, in a wide variety of different embodiments. This enables rich new levels of sophistication, variety, and flexibility in dialog with computer-controlled characters, while limiting the need for dialog elements to be individually, manually authored.

The Summary and Abstract are provided to introduce a selection of concepts in a simplified form that are further described below in the Detailed Description. The Summary and Abstract are not intended to identify key features or essential features of the claimed subject matter, nor are they intended to be used as an aid in determining the scope of the claimed subject matter. The claimed subject matter is not limited to implementations that solve any or all disadvantages noted in the background. Various embodiments provide a wealth of additional and unexpected advantages, beyond the resolution of difficulties with current solutions. A variety of other variations and embodiments besides those illustrative examples specifically discussed herein are also contemplated, and may be discerned by those skilled in the art from the entirety of the present disclosure.

DETAILED DESCRIPTION

Methods and other implementations described below enable rich new levels of sophistication, variety, and flexibility in dialog with computer-controlled characters, while limiting the need for dialog elements to be individually, manually authored. Developers of virtual worlds are enabled to define potential aspects of a state of the virtual world, and virtual, computer-controlled characters with knowledgebases associated with them. State aspects of the virtual world and elements of knowledge in the knowledgebases of its computer-controlled characters may be stored as abstract semantic structures that comprise logical representations of natural language elements. These new semantic structures can be generated from natural language inputs by the developers, and combined during runtime of the virtual world to generate new semantic structures. These semantic structures can then be converted back into natural language form to populate menus of potential user dialog elements, and computer-controlled character dialog elements responsive to the user dialog elements.

These natural language dialog elements can be dynamically generated in response to a user initiating an interaction with a computer-controlled character, also known as a non-player character, or a computer-controlled character initiating an interaction with a user. The natural language dialog elements thereby make use of an updated set of semantic structures potentially including the products of combined semantic structures from throughout the prior runtime of the virtual world. These automatically, dynamically generated dialog elements thereby provide a great variety and sophistication of potential computer-controlled character dialog, without such dialog having to be manually scripted.

Furthermore, because the dialog elements are dynamically generated using combinations of potentially any semantic structures from the virtual world and the computer-controlled character's knowledgebase, the potential sophistication of the computer-controlled character's dialog may grow exponentially relative to the increasing size and sophistication of the surrounding virtual world.

Methods and other implementations for dynamically generating natural language elements are disclosed as follows, according to a variety of embodiments. Different embodiments may be applied in computer games such as single-player or multi-player role-playing games, which may be hosted on a local computing device, or may be conducted over the Internet or other network, for example. Various embodiments may also be advantageously applied to other virtual environments, such as interactive tutorial applications, training or educational applications, or a general user interface, and potentially to any kind of computer-controlled character interaction. Various embodiments disclosed herein may enable low-cost methods of providing interesting and context-sensitive dialogue between a user and a computer-controlled character.

Figure 1:
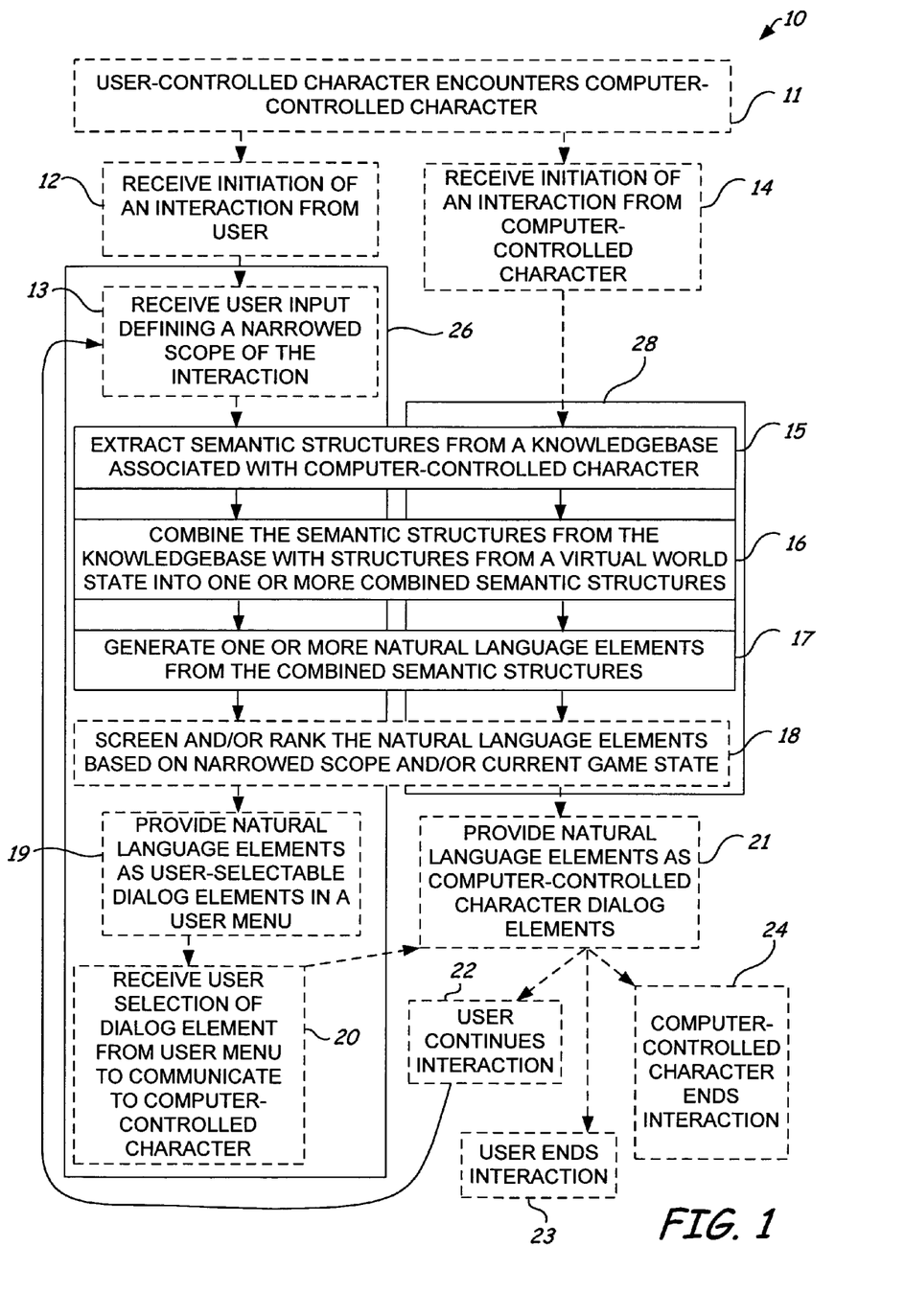
FIG. 1 depicts a flowchart for a method of dynamically generating natural language elements from combined semantic structures, according to an illustrative embodiment.

FIG. 1 depicts a flowchart for method 10, providing an illustrative example from among the variety of different possible embodiments. Method 10 may be implemented at least in part by a computing device, such as computer 110 or remote computer 180 of FIG. 4, or mobile computing device 201 or computing resources 224, 226 of FIG. 5, discussed further below, for example.

The core of method 10 includes step 15, of extracting one or more semantic structures from a knowledgebase associated with a computer-controlled character; step 16, of combining the semantic structures from the knowledgebase with one or more structures from a virtual world state into one or more combined semantic structures; and step 17, of generating one or more natural language elements from the combined semantic structures. Steps 15, 16, and 17 provide a way to generate new dialog between a computer-controlled character and a user that incorporates the computer-controlled character's particular knowledge and aspects of the current state of the virtual world.

The surrounding steps of method 10 provide examples of a context for using steps 15, 16, and 17 in an illustrative implementation. A user, through her user-controlled character, may encounter a computer-controlled character, as in step 11. Either the user or the computer-controlled character may initiate an interaction, as in steps 12 and 14, which engage steps 15, 16, and 17 and associated steps according to a user-initiated track 26 or a computer-controlled character-initiated track 28, respectively. The user may provide input that defines a narrower scope for the interaction, as in step 13, such as by selecting a certain object in the virtual world to ask the computer-controlled character about, for example.

Once the initiation of the interaction is received by a computing device running the virtual world, or by an object in the virtual world application, for example, steps 15, 16, and 17 are carried out, leading at the end of step 17 to natural language elements that have been generated based on the combined semantic structures from the computer-controlled character's knowledgebase and the current state of the virtual world. The combined semantic structures may be screened and/or ranked, such as by prioritizing them on the user's immediate goals in the current game state, eliminating dialog elements that refer to things the user hasn't learned about yet or has already accomplished, or prioritizing dialog elements referring to something the user is particularly asking about or to some other narrowed scope the user has defined, as in step 18. If the natural language elements are intended as the computer-controlled character's dialog elements, they are provided as such, as in step 21. If the natural language elements are intended as the user's dialog elements, they are provided as user-selectable dialog elements in a user menu that is provided, as in step 19.

The user may then select a dialog element from the user menu to communicate to the computer-controlled character, as in step 20. The user-selectable dialog elements are provided to the user menu already having corresponding computer-controlled dialog elements responsive to them, in this illustrative embodiment. Those responsive computer-controlled dialog elements can then be provided as in step 21. After the computer-controlled character has provided its dialog element, the user may choose to continue the interaction, as in step 22, and repeat the process; the user may choose to end the interaction, as in step 23; or the computer-controlled character may end the interaction, as in step 24. The computer-controlled character may also issue a dialog element, or a final dialog element, as a parting comment after it or the user chooses to end the interaction. These and other illustrative steps are further described as follows.

According to one illustrative embodiment, method 10 may be used in a Restricted Domain Question-Answer (RDQA) system, where a user controlling a character in a virtual world initiates an interaction with a computer-controlled character in the virtual world, such as by making a query of the computer-controlled character, and is provided a finite number of different questions or other dialog elements the user may select, from a menu, for example, to express to the computer-controlled character. The computer-controlled character similarly has a restricted amount of dialog elements available to provide in response, with the responses for each user dialog element pre-set before the optional user dialog elements are provided to the user, in one illustrative embodiment. This process begins when the computer receives a query from a user, or other initiation by a user or a computer-controlled character of an interaction between the two, within the runtime of a virtual world. The initiation of the interaction may take any of a wide variety of forms, including a simple greeting such as "hello"; a command, such as "Enchant this sword for me"; or a query, such as "Where can I find this amulet?" No sharp distinction is made between different types of ways to initiate an interaction, since the same type of communication may be couched in different ways, such as a command, a query, or a threat.

Figure 2:
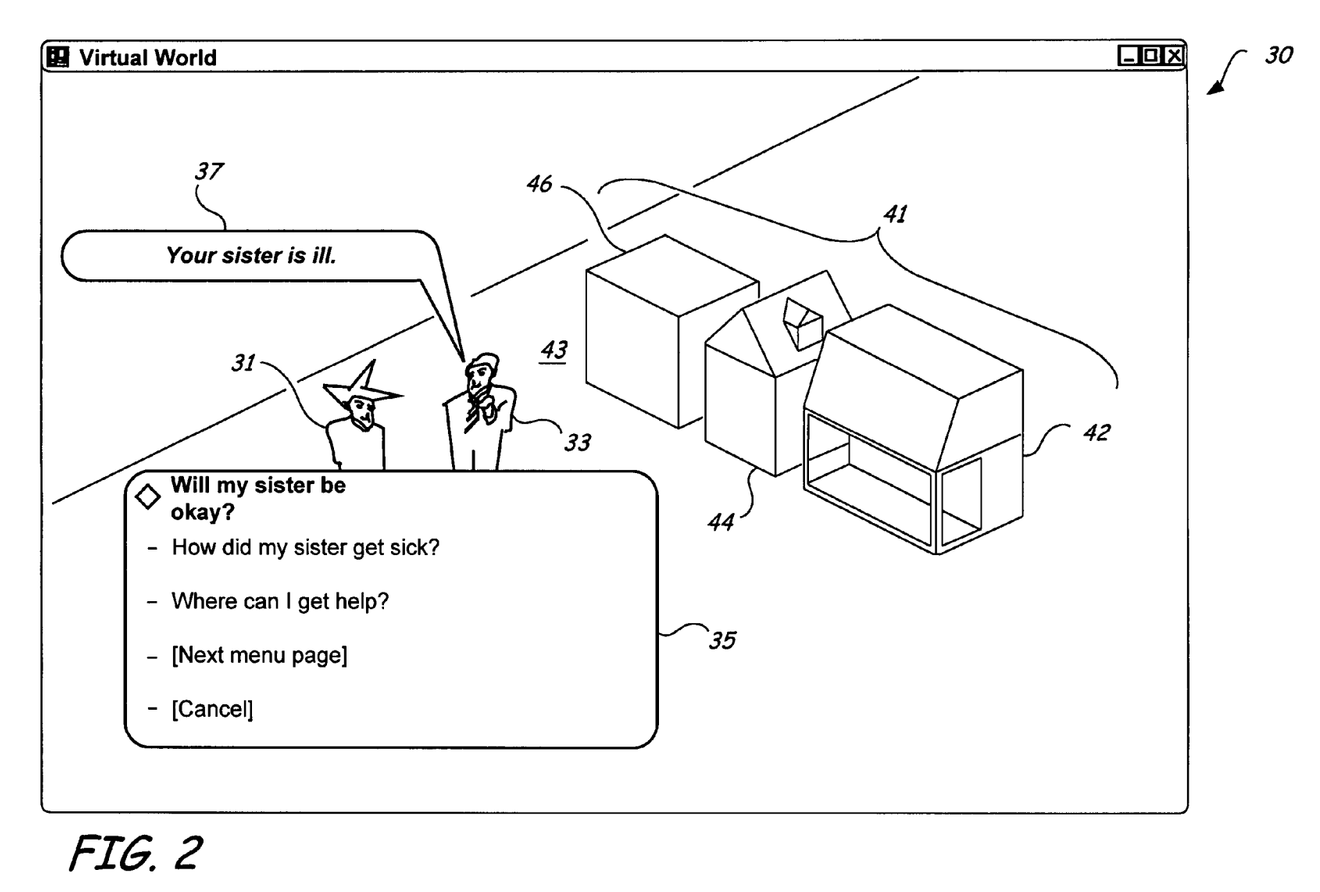
FIG. 2 depicts an image of a virtual world, generated by or stored on a computing device, according to an illustrative embodiment.

FIG. 2 depicts an illustrative example of such a virtual world 30, a portion of which is displayed for a user on a monitor. Virtual world 30 includes player character 31 that the user controls, and computer-controlled character 33, in this illustrative embodiment. The user, controlling or acting as player character 31 in virtual world 30, has encountered computer-controlled character 33 and has entered an input that indicates an initiation of an interaction of computer-controlled character 33 by the user's character 31.

The depiction of FIG. 2 displays the virtual world 30 after the user has controlled player character 31 to initiate an interaction with computer-controlled character 33. In response to the initiation of the interaction, the computer executes the steps needed to provide one or more menus such as menu 35 to the user. The menus include various user dialog elements visibly provided on the menu that the user may select to express to the computer-controlled character. Each of the user dialog elements is associated in a dialog element pair with a responsive dialog element representing an appropriate response that the computer-controlled character provides to the user in response to the associated user dialog element. This process provides the user with a relatively restricted selection of dialog elements and potential responses, based on criteria that ensure the user is offered dialog elements that are necessary or highly relevant to the user's current situation in the virtual world.

In the depiction of FIG. 2, the initial initiation of the interaction and dialog selection have been performed, and the computer-controlled character has responded to a first dialog element selection by providing a corresponding dialog element in speech bubble 37. The response by the computer-controlled character 33 may also be provided as an audible spoken-word response, instead of or in addition to a visible speech bubble 37, or may take any other form perceptible to the user. The user has in turn responded to the computer-controlled character's message in speech bubble 37 by continuing the interaction with the computer-controlled character, such as by again querying the character. This second query prompts the computer to repeat the process of composing and providing a user dialog menu 35, with new dialog elements selected to take into account the new state of the user's situation, now having knowledge of the computer-controlled character's initial message.

The computer produces user dialog menu 35 with different options for questions the user may select as dialog elements to pose to computer-controlled character 33. Menu 35 also includes an option to see an additional menu, i.e. a next menu page in this case, and an option to cancel the interaction and close the menu. The non-dialog options on menu 35 are listed in brackets.

To produce the menu dialog elements for each menu iteration in response to an initiation of an interaction, the computer extracts one or more semantic structures from a knowledgebase associated with computer-controlled character 33, as in step 13; and combines the semantic structures from the knowledgebase with structures from the current state of virtual world 30, as in step 15. The semantic structures are abstract representations of knowledge, which facilitate being logically combined to generate new structures. The structures are extracted and combined dynamically, in the sense that they are extracted and combined only after an initiation of an interaction is received from the user or from a computer-controlled character. The natural language elements are generated from the combined semantic structures, as in step 19. Because the state of the virtual world changes over time, and the knowledgebase associated with a computer-controlled character may also change over time, as reflected in the structures in the virtual world state and in the character's knowledgebase, combining them dynamically may generate different results at any time, and are therefore sensitive to when the user or the computer-controlled character initiates the interaction.

A particular computer-controlled character's knowledgebase may contain a hierarchy of knowledgebase components. For example, computer-controlled character 33 may have an associated knowledgebase that includes knowledge attributed to every computer-controlled character in the virtual world 30, knowledge attributed to everyone in the town in which computer-controlled character 33 lives, and knowledge held uniquely by computer-controlled character 33. The knowledgebases associated with each of the computer-controlled characters with each of the computer-controlled characters may be pre-set and unchanging in one embodiment, or may be updated according to aspects of the changing state of the virtual world 30 that a computer-controlled character learns from, in a different embodiment.

In the case of computer-controlled character knowledgebases that are being added to over time, the recently added semantic structures and the original semantic structures are equally subject to being dynamically extracted and combined in response to an initiation of an interaction. The dynamic generation of natural language elements may therefore incorporate the computer-controlled character's recently acquired information. Additions to the computer-controlled character's knowledgebase may incorporate any kinds of information from the virtual world, including information on changes that occur in the virtual world, changes introduced by user characters, and information on prior words or actions of a user character.

The semantic structures composing computer-controlled character knowledgebases may take any of a wide variety of forms in different embodiments. In one illustrative embodiment, the semantic structures are composed of logical forms based on a tree structure. Each node of a tree structure corresponds approximately to a content word in an original sentence of natural language. In this structure, function words have been removed and the words have been normalized to their base form.

In one embodiment, the semantic structures may be entered directly by the developer of the virtual world. This has the advantage that it allows the developer's intended semantic meanings to be encoded with precision. It uses a formal notation that allows logical precision and forestalls ambiguity. However, it also has the drawback that coding semantic structures from scratch requires mastery of a fairly difficult understanding of semantic representations. A wide range of semantic representation systems are used; for example, several semantic representation systems are based on different variations of a first-order predicate calculus representation.

Another system of creating semantic structures works indirectly, but requires far less training: to use natural language descriptive inputs, that are automatically parsed by natural language processing tools into a representation style known as logical forms. The logical forms encode semantic relations between terms in different semantic descriptions.

Logical forms are relatively easy and intuitive for a developer without prior training to pick up and use, while those with the needed training may prefer to write semantic code directly to ensure greater precision. In different embodiments, either or both of these methods, or still other methods, may be used to create the semantic structures to be associated with the knowledgebases associated with the computer-controlled characters. Encoding semantic structures with logical forms is further described as follows.

In one example, a developer uses a software application embodying a method or computer-executable instructions implementing an illustrative embodiment, to add semantic structures to a virtual world that describe potential state aspects of the virtual world, and to add semantic structures to the knowledgebases of computer-controlled characters. The semantic structures added to the virtual world may be input by the developer in natural language form, annotated with reference tags; for example, such as "this(242) is a cave." This natural language description as input by the developer is then translated into a semantic structure by a natural language processing tool, such as a parsing tool, associated with or included in a software application embodying a method of the illustrative embodiment. The semantic structures may take a form corresponding to the following illustrative representations. "This(242) is a cave" may be semantically represented as:

This semantic structure encodes the semantic relations (or "semrels") between the content words. In this semantic structure, the "Dsub", or the deep subject, is "this" ("this1"), which is indicated to be a singular pronoun, and to be associated with an identifier tag 242 (not depicted in FIG. 2). The verb relating the subject to the object is "be" ("be1"), the infinitive (normalized) form of "is" (which is the present tense form). The translation of "is" into "be" plus a marker indicating present tense illustrates how a word is normalized and how syntactic features are recorded in a tree structure. The "Dobj", or deep object, of the semantic structure is a cave ("cave1"); it is also indicated in this case to be indefinite and singular.

A first semantic structure added to the computer-controlled character's knowledgebase may refer to a particular aspect of the virtual world state having to do with the cave with the identifier tag 242, and may be input by the developer, in natural language form, as "There's a dragon in that cave(242)." The developer may also add another natural language description to the computer-controlled character's knowledgebase that encodes a piece of general knowledge, rather than referencing a particular aspect of the virtual world state; for example, a description reading, "Dragons have treasure."

These natural language descriptions as input by the developer are also translated into semantic structures by a natural language tool associated with or included in the present embodiment. "There's a dragon in that cave(242)" may be represented in the form of the following semantic structure:

In this semantic structure, the "Dsub", or the deep subject, is "dragon" ("dragon1"), which is indicated to be a noun. Because "dragon1" is indicated to be indefinite and singular ("Indef" and "Sing"), it refers to dragons in general, rather than a particular dragon or multiple dragons. The verb relating the subject to the object is "to be" ("be1"), indicated as a present tense verb. The object of the semantic structure is a location ("Locn"), which is indicated to be "cave1" associated with object identifier tag 242, which will associate it with "cave242" from the object semantic structure, described above.

Similarly, "Dragons have treasure" may be semantically represented in the form of the following semantic structure:

If a user selects another computer-controlled character who lacks knowledge about cave 242, the semantic structures from that computer-controlled character's knowledgebase will not include any descriptions of the cave to combine with structures from the virtual world state that describe the cave. So, the natural language dialog elements generated by combining the semantic structures from this computer-controlled character's knowledgebase with structures from the virtual world state will not include any interactions that will tell the user what she cannot find out for herself about the cave, and will only include general interactions such as "What is that?"—"That is a cave."

However, if the non-player character's knowledgebase does include semantic structures that relate to the cave, these may be combined with structures from the current virtual world state to provide new natural language dialog elements about the cave, enabling the user to select new questions and receive answers that reveal new information to the user. For example, the computer-controlled character may have in its knowledgebase semantic structures indicating that cave 242 has treasure and a dragon in it. Combined with a semantic structure from the virtual world state indicating that "that cave" nearby being indicated by the user's character corresponds to cave 242, the non-player character will be able to dynamically combine the semantic structures to produce the natural language response, "That cave has a dragon in it, and dragons have treasure."

Dynamically combining the semantic information in a manner such as this provides for dramatically more sophisticated and interesting interaction with the computer-controlled characters, than is typically feasible or cost-effective through manual dialog scripting. In different embodiments, both the semantic structures from the virtual world state may change over time, and the semantic information stored in a non-player character's knowledgebase may change over time, reflecting new knowledge gained by the non-player character. In contrast with pre-scripted outputs, which a player may quickly find predictable after a nominal amount of time playing a game, the dynamically created outputs of the present embodiment provide a great variety of different natural language element outputs, making use of semantic structures from any possible permutation in which the semantic structures of its knowledgebase and of the transient state of the virtual world may be combined. This engine of variety is likely to produce a greater diversity of possible natural language dialog from computer-controlled characters than would be practically or economically feasible by manual scripting. As a virtual world is made bigger and more complex, this exponentially multiplies both the possible natural language outputs and the advantage over manual dialog authoring, and also enables the computer-controlled characters to generate new responses from new combinations of structures that might have been unforeseen by the game developer or that might only become possible after significant changes have taken place in the virtual world.

This becomes especially significant in the case of very large and complex virtual worlds, such as may be used in large and sophisticated single-player computer games, for example, where there may be a large number of computer-controlled characters for the player to interact with. To try, in such a virtual world, to match the possibilities of dynamically generated outputs using semantic structures, by instead trying to rely on scripted outputs, would be prohibitively difficult. The response provided by a particular non-player character at various times may therefore remain sensitive to the current context, and show a far greater variety than could be feasibly or economically achieved by manual scripting, thereby contributing greatly to the illusion of intelligence on the part of the computer-controlled characters.

Semantic structures may describe the size, shape, color, history, or any other descriptive properties of a state of a virtual world or something in it at a given point in time. All the semantic structures may be associated with various potential game states during creation of the virtual world, prior to the beginning of game play within the virtual world, and may continue to change during runtime of the virtual world to reflect changes taking place in the virtual world. The events and changes initiated by users within the course of the game may also alter the state of the virtual world and the associated semantic structures.

Figure 3:
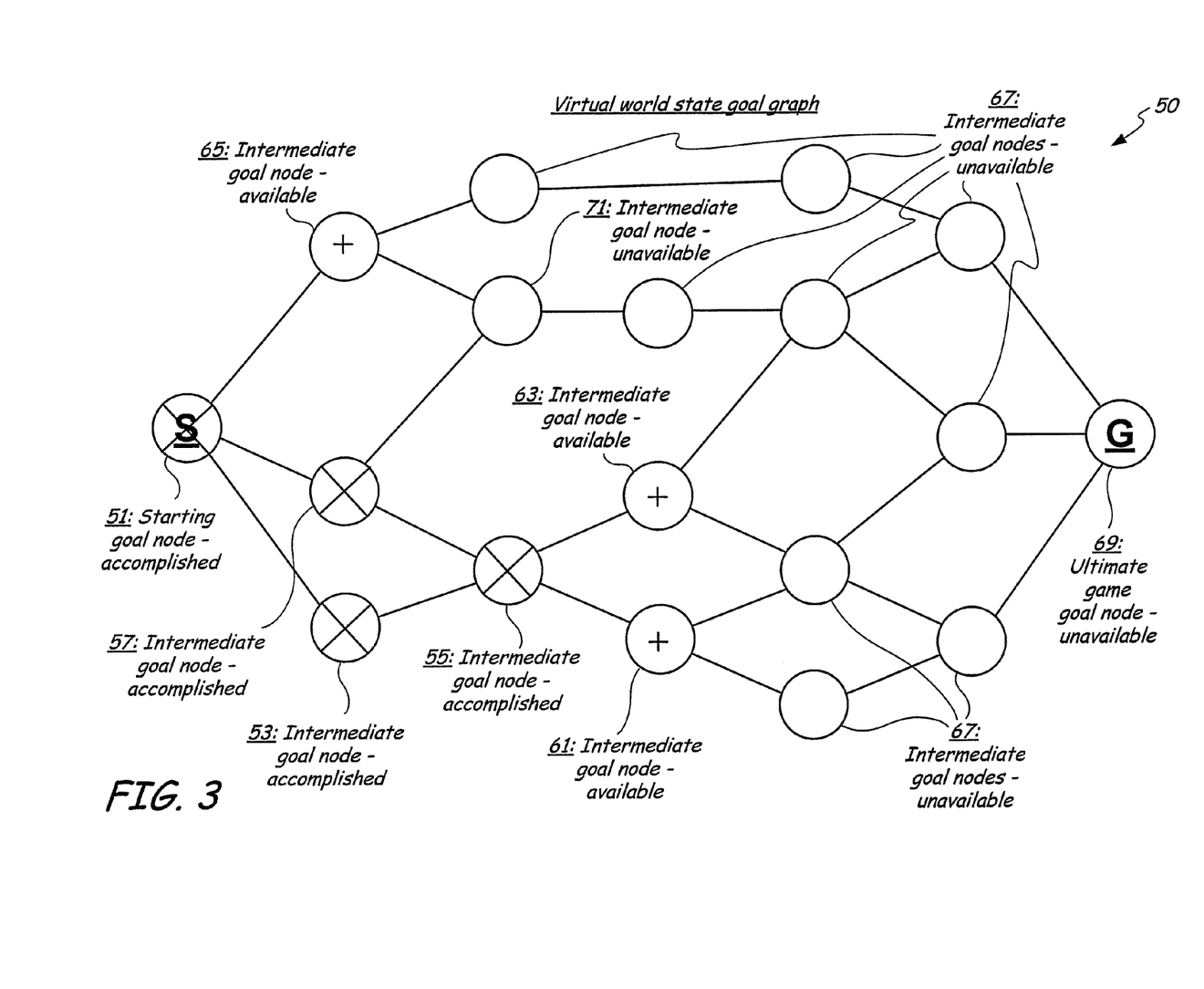
FIG. 3 depicts a state structure of a virtual world, according to an illustrative embodiment.

Tokens may also be used to track aspects of the virtual world state. FIG. 3 depicts a diagram of a goal graph 50 of a virtual world state, showing dependencies of interrelated objectives or goals in a game, a tutorial, or another goal-oriented activity in a virtual world. These may be, for example, accomplishing missions in a game that open the way for the player to pursue new missions; or finishing lessons in an educational program, where certain lessons are prerequisites to begin more advanced lessons, as a couple of illustrative examples. The virtual world state may include descriptions of the current state of components of the virtual world. The virtual world state may also include indicators of progress by a user in accomplishing a set of interrelated goals as part of a game or other activity in the virtual world. The illustrative example of a game is described below, with the understanding that none of the description is limited to games as opposed to any of a broader range of goal-oriented activities in a virtual world.

The virtual world state goal graph 50 includes several tokens occupying nodes in a network that indicates dependencies of goals in the virtual world, in this illustrative embodiment. The prerequisite dependencies of the different goals are indicated from left to right, and form an interlocking network of different dependencies.

Different indications may be applied to each node, including whether the corresponding goal has already been accomplished, is currently available for the user to pursue and accomplish, or whether the user has not yet cleared the prerequisites for a goal to be available, for example. Different indications such as these constitute part of the current state of the virtual world over time.

Node 51 indicates a starting goal in the game. From the introductory goal associated with node 51, three goals are available for the user to accomplish. Goal graph 50 is depicted in a game state in which some early goals have been accomplished, represented by the additional exed-out nodes 53, 55, 57.

Goals that are currently available for the user to pursue and accomplish according to the current world state have their corresponding nodes marked with a cross, in the diagram of FIG. 3. These include nodes 61, 63, and 65. For each currently available goal, the goal nodes connected to the left have already been accomplished, indicated by being exed-out. Many of the goal nodes 67 remain blank in the depiction of FIG. 3, indicating goals that are not yet available for the user to pursue, because their prerequisite goals have not yet been accomplished. Node 71 represents a goal for which one prerequisite goal, but not the other, has been accomplished. In the present illustrative embodiment, the goal graph 50 uses an implicit AND dependency, so that each goal can only be performed when all prerequisite goals have been previously accomplished. Alternative embodiments could also use OR dependencies for some or all goal prerequisites, so that any one of several preconditions would suffice. For example, different parallel nodes may represent discovering the location of the dragon's cave either from finding and reading a map, or from finding and talking to a wizard, where either goal enables the pursuit of the subsequent goal. Different embodiments could also use XAND, XOR, and other logical dependencies, or a combination of any of the above. Node 69 represents the ultimate goal of the game, which can only be accomplished after all the subsidiary goals have been fulfilled.

The tokens associated with the nodes of goal graph 50 may represent the focus of the associated goal, which may represent anything the game designer might imagine. For example, the nodes might involve possession of an item or subject, so one node may indicate possession of a potion, another node may be associated with a token indicating possession of a sword, and so forth. Nodes may also be associated with knowledge of a certain item or subject, such as a token indicating knowledge of a cave and its location, and yet another node may be associated with a token indicating knowledge of a dragon, for example. Still other nodes may represent accomplishment of a particular task, such as arriving at a cave, or slaying the dragon. Any other type of goal is also possible.

For example, in a game embodiment, the starting goal associated with node 51 may be simply to receive information from a computer-controlled character who explains what the user's ultimate goal is, and gives an overview of what the user must do to accomplish that ultimate goal. After accomplishing that initial goal of discovering the overarching goal of that level of the game, the user may become enabled to pursue any of three subsequent, parallel goals, corresponding to nodes 57, 53, and 65. These may be, for example, to find a map, to receive a password for opening a door of a secret chamber shown on the map, and to find a magic potion, respectively. Finding the map and receiving the password may both be required to gain access to a magic sword, the goal corresponding to node 55. So, in the game state depicted in FIG. 3, the user has found the map and the password (nodes 57, 53), and has used those to acquire the sword (node 55), but has not yet found the potion (node 65), which is a currently active goal; and the user has two additional goals currently available, corresponding to nodes 61 and 63, that became available once the user acquired the sword.

The tokens in the goal graph 50 of the virtual world state correspond to nodes representing objectives, while tokens in the logical forms in a computer-controlled character knowledgebase correspond to nodes in the semantic tree structure of the knowledgebase. Combining the semantic structures from the knowledgebase with the structures from the virtual world state, as in step 15, may include performing algorithms that automatically associate semantic structures in the knowledgebase with structures from the virtual world state that share tokens in common, such as "cave", "dragon", or "potion", for example. Combining these structures enables the computer to generate natural language elements from the combined semantic structure to the user, such that these natural language elements reflect the computer-controlled character's knowledge of the state of the virtual world.

There may be a great many intersections between the knowledgebase associated with a computer-controlled character and the state of the virtual world, as represented by tokens in common between the two. Methods are provided for screening out combined semantic structures that are not relevant, or evaluating the relevance and ranking the combined semantic structures by their evaluated relevance, according to various illustrative embodiments. This may be accomplished by comparing the combined semantic structures to the virtual world state, such as the virtual world state represented by goal graph 50 of FIG. 3 as described above. This comparison may include comparing the combined semantic structures to the current goals associated with the user at the time of the initiation of an interaction, that is, the goals that are currently available for the user to pursue in the current world state, such as those associated with nodes 61, 63, and 65 in FIG. 3. It may further include checking which of the possible goals have already been accomplished by the user, and which of the possible goals remain available to be pursued and accomplished, based on the goals that have already been accomplished.

A scoring function may be used to assign various scores to combined semantic structures based on how interesting and relevant they would be to a user based on the current virtual world state, with combined semantic structures that include a token associated with a currently available goal ranked highest. Combined semantic structures containing tokens associated with goals that are not yet available to pursue may be ranked low, potentially in an ordering with those that are only one node removed from the currently available goals being ranked higher than those that are two nodes removed from the current goals, and so on, in one illustrative embodiment. Alternately, in other cases, combined semantic structures associated with goals that are not yet available may be screened out altogether, corresponding with the user not yet having enough information to have reason to ask about that information.

Knowledge associated with goals that have already been accomplished may likewise either be ranked low, or screened out altogether. It may be desirable to include them but with a low rank in the case where information previously given may still be necessary or useful for a later goal, but which the user may have forgotten and might usefully be reminded of. In other cases, information related to a goal already accomplished may serve no further use in the game or the goals of the virtual world, and so may be screened out altogether.

Methods of screening and ranking the combined semantic structures giving rise to the natural language dialog elements provided to the user are effective in providing the most useful, interesting, and relevant natural language dialog options to the user. The highest ranked natural language elements may be listed in a first-level menu that appears first in response to an initiation of an interaction, such as when a user queries a computer-controlled character. The first menu may include an option to go on to a second menu of natural language dialog elements to select from, and this may lead to a third, and so on. However, screening and/or ranking the combined semantic structures ensures that the user does not have to scroll through a long list of marginally relevant dialog before turning up dialog elements that are useful and relevant to her current situation. In some embodiments it is also desirable to limit the number of menus and the number of natural language dialog elements available to the user, to ensure that the user may seek the knowledge that is relevant and useful, without having too many options to distract from continuing to subsequent aspects of the virtual world.

After each iteration of the user selecting a dialog element from a menu and receiving the computer-controlled character's response, the computer may repeat the method of combining semantic structures to provide a new menu or set of menus of natural language dialog elements, in one illustrative embodiment. This may ensure that the knowledge the user received from the previous dialog exchange is re-ranked to a low rank or is now screened out, so that the user does not have the likelihood of eliciting the same knowledge from the computer-controlled character all over again. This may also introduce new knowledge that was screened out before because the user did not yet know enough to ask the right question, but that is now available for the user to discover. For example, if the non-player character has knowledge of a mountain that the user doesn't know anything about yet that sits on the other side of a mountain range currently visible to the user, and there is a goal that the user must accomplish at that mountain but that is still a few nodes removed from the user's current goals, then the combined semantic structures associated with that mountain may be either ranked low, or screened out altogether, for the natural language dialog elements provided for that user.

In another illustrative embodiment, instead of menus being presented for the user to choose natural language dialog elements from, the user may instead engage in spoken or written language to initiate an interaction with the computer-controlled characters. In this case, after the user initiates the interaction with the computer-controlled character and the natural language elements are generated, the user may pose a spoken-word question or other dialog element to the computer-controlled character. One of the natural language elements may then be selected that presents the greatest similarity to the spoken-word dialog element, as interpreted using methods of automatic speech recognition (ASR) to translate the spoken-word dialog element into text.

The comparison between the text input, or the ASR text translation of the user's spoken-word dialog element, and the generated natural language dialog elements, may be performed by natural language processing (NLP) methods such as a support vector machine or a maximum entropy classifier, for example, among a variety of other implementations. A confidence threshold may also be applied, so that if the user's dialog element does not correspond to any of the available natural language dialog elements with sufficient confidence, an appropriate default action can be taken, such as the program providing the user with a visible menu to choose from; or the computer-controlled character asking the user to repeat himself, or ending the dialog with the user, for example. When using automatic speech recognition instead of a menu of pre-provided optional dialog elements, it may be more effective to generate a wider variety of natural language dialog elements, providing a variety of different ways in which the same question or other dialog element might be posed in natural language, to try to anticipate a greater fraction of the likely variety with which different users may phrase their dialog with the computer-controlled characters.

In another illustrative embodiment, a software application is provided that enables developers to create a three-dimensional virtual world and populate the virtual world with computer-controlled characters having associated knowledgebases, enabled for dynamic dialog generation. The virtual world and computer-controlled characters are defined by inputs from the developer such that semantic structures, or language representations, from the knowledgebases may be combined with structures representing the state of the virtual world to generate natural language dialog elements in response to an initiation of an interaction between a user and a computer-controlled character. The three-dimensional virtual world, as it is modeled on a computer, may be depicted in two-dimensional views on a flat computer monitor. These views may represent the perspective view of a player character within the game, for example, or the virtual world may be depicted according to a "bird's-eye" view from above the player character, such as in FIG. 2.

The software application may further enable a computer to receive the inputs defining the virtual world and its state structure, and the computer-controlled characters with their knowledgebases, in the form of natural language inputs that may be automatically parsed by natural language processing tools into representations of language, as described above, according to this illustrative embodiment. The software application is further enabled to combine the language representations from both the computer-controlled character knowledgebases and the virtual world state in an abstract form, to dynamically generate dialog elements from the combined language representations, and to translate the dynamically generated dialog elements from the abstract form to a natural language form.

A developer using this software is also enabled to test the state structure of the virtual world to ensure that a user character is able to receive the needed dialog elements to progress through the network of goals to achieve the ultimate goal, without either too much difficulty, or too little. In one illustrative embodiment, a developer may wish to ensure that it is possible for a game player to progress through an entire game using the dialog elements available on top-level menus, and that the appropriate dialog elements are therefore being correctly given high rankings throughout the progress of the goal graph 50. The developer may also ensure that the game has no dead ends, or ways in which it becomes impossible to progress through all the goals. The software application may also be tested to ensure there are no parsing generation errors, and that the semantic structures and virtual world state structures are being combined and translated into natural language dialog elements appropriately and not producing spurious natural language elements.

Methods and media that implement the subject matter described above according to a wide variety of embodiments may be implemented in a broad range of different computing devices and computing environments. For example, method 10 may be implementable by a computing device by enabling the computing device through executable instructions stored on a medium readable by the computing device, for example. The term "computer" may be used interchangeably with the term "computing device", without implying any limitation on the particular form of computing device that may be involved in different embodiments. A few illustrative systems and environments with which various embodiments can be used are provided in FIGS. 4 and 5.

Figure 4:
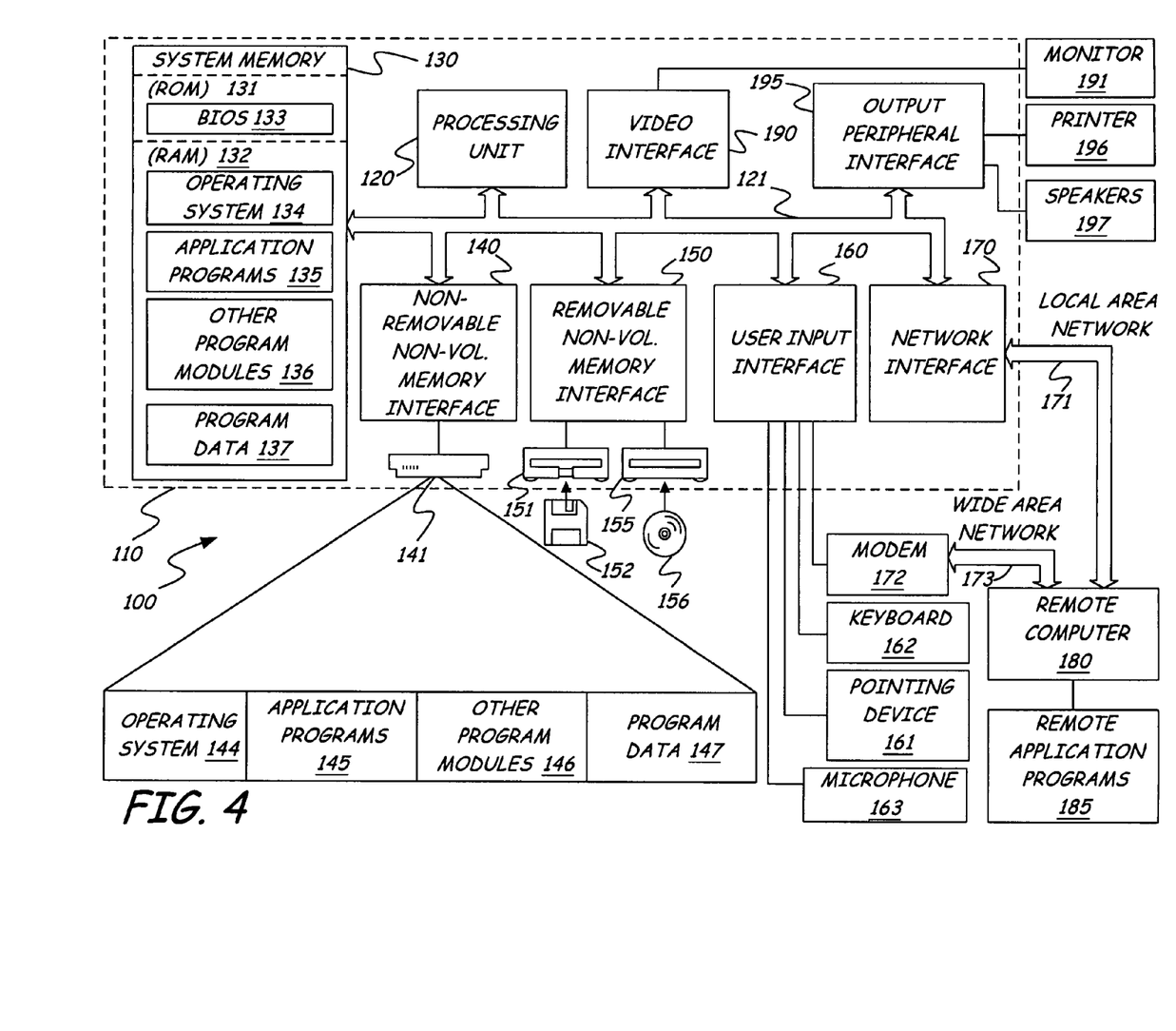
FIG. 4 depicts a block diagram of a general computing environment, comprising a computer and a medium readable by the computer, and comprising executable instructions that are executable by the computer, according to an illustrative embodiment.

FIG. 4 depicts a block diagram of a general computing environment 100, comprising a computer 110 and various media such as system memory 130, nonvolatile magnetic disk 152, nonvolatile optical disk 156, and a medium of remote computer 180 hosting remote application programs 185, the various media being readable by the computer and comprising executable instructions that are executable by the computer, according to an illustrative embodiment. FIG. 4 illustrates an example of a suitable computing system environment 100 on which various embodiments may be implemented. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Various embodiments may be implemented as instructions that are executable by a computing device, which can be embodied on any form of computer readable media discussed below. Various additional embodiments may be implemented as data structures or databases that may be accessed by various computing devices, and that may influence the function of such computing devices. Some embodiments are designed to be practiced in distributed computing environments where tasks are performed by remote processing devices that are linked through a communications network. In a distributed computing environment, program modules may be located in both local and remote computer storage media including memory storage devices.

With reference to FIG. 4, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 4 illustrates operating system 134, application programs 135, other program modules 136, and program data 137.

The computer 110 may also include other removable/non-removable volatile/nonvolatile computer storage media. By way of example only, FIG. 4 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 4, provide storage of computer readable instructions, data structures, program modules and other data for the computer 110. In FIG. 4, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may be operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 4 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 4 illustrates remote application programs 185 as residing on remote computer 180. It will be appreciated that the network connections shown are exemplary and other means of establishing a communications link between the computers may be used.

Figure 5:
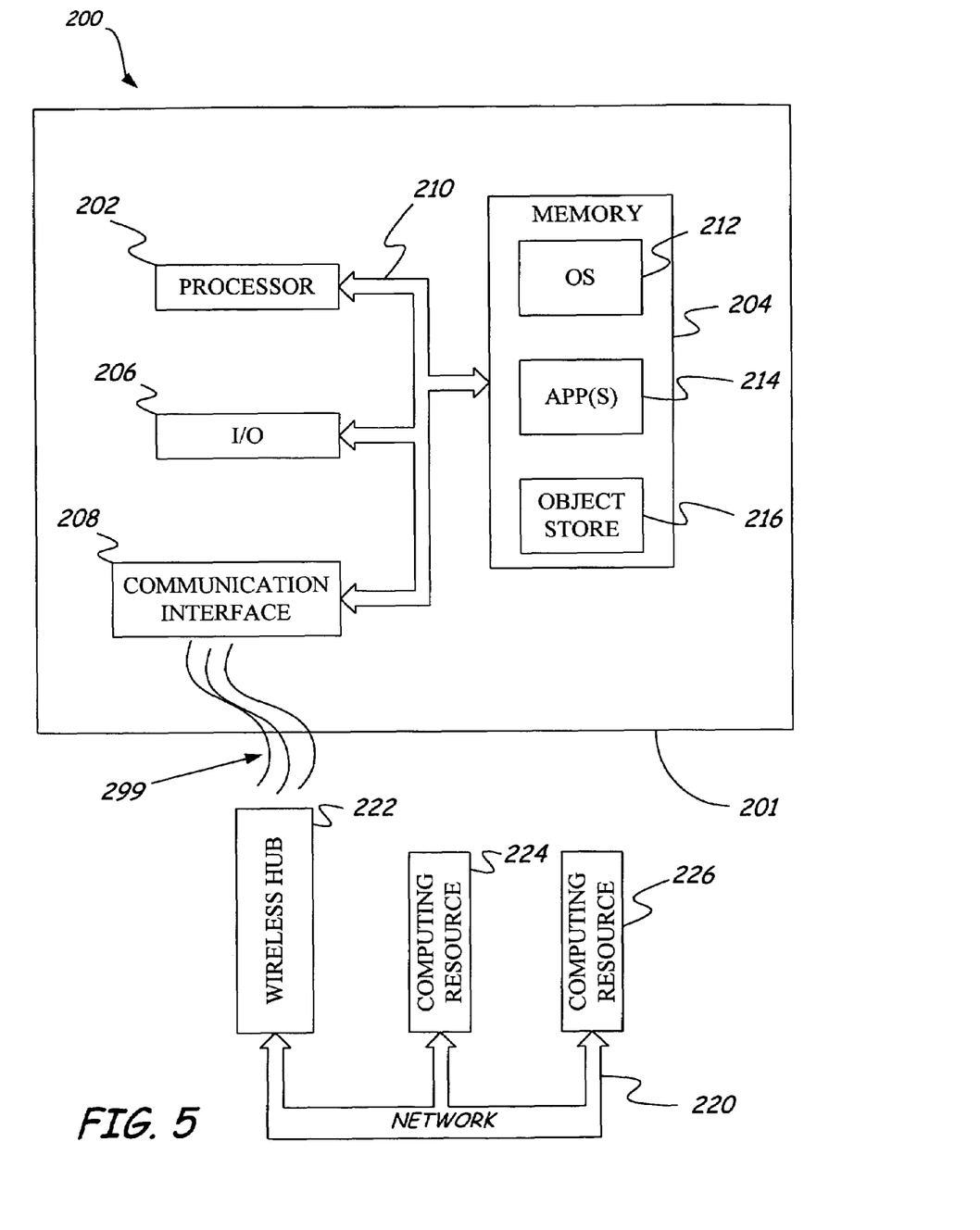
FIG. 5 depicts a block diagram of a general mobile computing environment, comprising a mobile computing device and a medium readable by the mobile computing device, and comprising executable instructions that are executable by the mobile computing device, according to an illustrative embodiment.

FIG. 5 depicts a block diagram of a general mobile computing environment, comprising a mobile computing device and a medium, readable by the mobile computing device and comprising executable instructions that are executable by the mobile computing device, according to another illustrative embodiment. FIG. 5 depicts a block diagram of a mobile computing system 200 including mobile device 201, according to an illustrative embodiment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is illustratively allocated as addressable memory for program execution, while another portion of memory 204 is illustratively used for storage, such as to simulate storage on a disk drive.

Memory 204 includes an operating system 212, application programs 214 as well as an object store 216. During operation, operating system 212 is illustratively executed by processor 202 from memory 204. Operating system 212, in one illustrative embodiment, is a WINDOWS® CE brand operating system commercially available from Microsoft Corporation. Operating system 212 is illustratively designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Mobile computing system 200 also includes network 220. Mobile computing device 201 is illustratively in wireless communication with network 220—which may for example be the Internet, or some scale of area network—by sending and receiving electromagnetic signals 299 of a suitable protocol between communication interface 208 and wireless hub 222. Wireless hub 222 in turn provides access via network 222 to a wide array of additional computing resources, illustratively represented by computing resources 224 and 226. Computing device 201 is enabled to make use of executable instructions stored on the media of memory component 204, such as executable instructions that enable computing device 201 to perform steps such as combining language representations associated with states of a virtual world with language representations associated with the knowledgebase of a computer-controlled character, in response to an input from a user, to dynamically generate dialog elements from the combined language representations, as one illustrative embodiment.

Although the subject matter has been described in language specific to structural features and/or methodological acts, it is to be understood that the subject matter defined in the appended claims is not necessarily limited to the specific features or acts described above. For example, while references are made in particular embodiments to entering or generating natural language elements in text format, other embodiments may be combined with other user interface and natural language technologies to use other forms of input and output, such as handwriting input or text or speech input and output, for example. The embodiments related to computer games are only illustrative examples, and other embodiments are not limited to games. In various additional embodiments, for example, the virtual world with computer-controlled characters may serve as a training or educational program. Developers may also be enabled by various embodiments to create virtual worlds with computer-controlled characters for such training or educational programs. This may include, for example, training and testing programs for firefighters, policemen, or astronauts. It may also include training and testing programs for medical students, for example, to simulate emergency room experiences where they must evaluate injuries and symptoms and ask appropriate questions of computer-controlled characters accompanying the computer-controlled patient characters of what they saw of the injury or what potential symptoms they might have noticed at earlier times. In another illustrative embodiment, it may also include training and testing programs for science students, who are presented with virtual models of scientific phenomena, and may try to come up with the right clues to ask of a computer-controlled professor character as they try to calculate answers to problems involving the interactions depicted in the virtual world. While illustrative examples have included certain specific techniques using tokens associated with nodes in knowledgebases and world states, and screening and ranking based on proximity of tokens in combined semantic structures to currently active goals in the world state, additional embodiments are contemplated that are not limited to these illustrative examples. While English-language examples have been used, different embodiments could apply to any other languages, generating natural language elements in any languages, and using natural language processing tools appropriate to those languages. The specific features and acts depicted in the figures and described throughout the Detailed Description are disclosed as illustrative examples that embody or implement the claims, while the broadest and most generalized applications of the claims are not limited to the illustrative embodiments herein, and define a very wide range of additional embodiments.

What is claimed is:

1. A method, implemented by a computing device comprising a processor and one or more output devices communicatively connected to the processor, the method comprising:
    extracting, with the processor, one or more semantic structures from a knowledgebase associated with a computer-controlled character;
    combining, with the processor, the semantic structures from the knowledgebase with one or more structures from a virtual world state into one or more combined semantic structures;
    generating, with the processor, one or more natural language elements dynamically generated based on both the combined semantic structures and inputs from the user; and
    providing, via one or more of the output devices, the natural language elements in menus of user-selectable dialog elements and in computer-controlled character dialog elements responsive to the user-selectable dialog elements, the natural language elements being provided to a user via one or more of the one or more output devices.

2. The method of claim 1, further comprising receiving an initiation of an interaction with a user, and providing the natural language elements in response to the initiation of the interaction.

3. The method of claim 2, further comprising receiving a user input defining a narrowed scope of the interaction, and screening out combined semantic structures that are not relevant or appropriate to the narrowed scope of the interaction.

4. The method of claim 2, further comprising evaluating the combined semantic structures for relevance and appropriateness to the initiation of the interaction, and ranking the combined semantic structures by their evaluated relevance and appropriateness.

5. The method of claim 4, wherein evaluating the relevance and appropriateness of the combined semantic structures to the initiation of an interaction comprises comparing the combined semantic structures to the virtual world state.

6. The method of claim 5, in which comparing the combined semantic structures to the virtual world state comprises comparing the combined semantic structures to one or more current goals associated with a user at the time of the initiation of an interaction.

7. The method of claim 6, wherein comparing the combined semantic structures to one or more current goals associated with the user at the time of the initiation of an interaction comprises checking which of one or more possible goals have been accomplished by the user, and which of the possible goals are available based on the goals that have been accomplished.

8. The method of claim 2, wherein receiving the initiation of the interaction comprises receiving a spoken-word input from the user, and evaluating the combined semantic structures for relevance and appropriateness to the initiation of the interaction comprises comparing the combined semantic structures to the spoken-word input.

9. The method of claim 1, further comprising providing one or more of the natural language elements in a menu of user-selectable interactions.

10. The method of claim 9, wherein one or more of the natural language elements provided in the menu of user-selectable interactions are selected and ranked according to their relevance and appropriateness to the virtual world state.

11. The method of claim 1, further comprising adding one or more of the structures from the virtual world to the knowledgebase associated with the computer-controlled character, and later combining the semantic structures from the knowledgebase with structures from a subsequent virtual world state to generate the natural language elements.

12. A method, implemented by a computing device comprising a processor and one or more output devices communicatively connected to the processor, the method comprising:
   providing, with the processor, a computer-controlled character in a virtual world;
   associating, with the processor, the computer-controlled character with a semantic knowledgebase;
   responding, with the processor, to an initiation of an interaction with the computer-controlled character by combining semantic representations from the semantic knowledgebase with semantic representations from the virtual world, thereby generating semantic dialog elements dynamically generated based on both the combined semantic structures and inputs from the user, and providing the semantic dialog elements via one or more of the output devices;
   in which the semantic dialog elements generated comprise one or more user dialog elements, and one or more computer-controlled character dialog elements responsive to the user dialog elements.

13. The method of claim 12, further comprising providing one or more of the user dialog elements in a user-selectable dialog menu.

14. The method of claim 13, further comprising responding to a user selection of one of the user dialog elements by providing one of the character dialog elements that is responsive to the user dialog element of the user selection.

15. The method of claim 14, further comprising responding to the user selection of one of the user dialog elements by generating additional user dialog elements and providing one or more of the additional user dialog elements in a new user-selectable dialog menu.

16. A storage medium, readable by a computing device and comprising executable instructions that are executable by the computing device, in which when the executable instructions are executed, cause the computing device to:
   receive inputs defining a virtual world described by a state that may be influenced by a user;
   receive inputs defining one or more computer-controlled characters;
   receive inputs defining one or more language representations;
   receive inputs associating one or more of the language representations with one or more states of the virtual world, and one or more of the language representations with knowledgebases of one or more of the computer-controlled characters;
   combine one or more of the language representations associated with one or more of the states of the virtual world with one or more of the language representations associated with the knowledgebase of one of the computer-controlled characters, in response to an initiation of a user interaction, to dynamically generate one or more dialog elements based on both the combined language representations and inputs from the user; and
   provide the dialog elements in computer-controlled character dialog elements via one or more output devices.

17. The medium of claim 16, in which when the executable instructions are executed, further cause the computing device to receive the input as natural language inputs, and to translate the natural language inputs into the abstract language representations.

18. The medium of claim 16, in which when the executable instructions are executed, further cause the computing device to receive and combine the language representations in an abstract form, and to translate the dynamically generated dialog elements from the abstract form to a natural language form.

* * * * *